United States Patent
Tang et al.

(10) Patent No.: US 11,466,502 B2
(45) Date of Patent: Oct. 11, 2022

(54) NUT LEADSCREW TYPE AUTOMATIC DOOR OPENING AND CLOSING MECHANISM, AUTOMOBILE AUTOMATIC DOOR, AND AUTOMOBILE

(71) Applicant: Winbo-Dongjian Automotive Technology Co., Ltd., Foshan (CN)

(72) Inventors: Weihang Tang, Foshan (CN); Jingui Rao, Foshan (CN); Yonglin Liao, Foshan (CN); Fei Deng, Foshan (CN)

(73) Assignee: Winbo-Dongjian Automotive Technology Co., Ltd., Foshan (CN)

( * ) Notice: Subject to any disclaimer, the term of this patent is extended or adjusted under 35 U.S.C. 154(b) by 0 days.

(21) Appl. No.: 17/049,294

(22) PCT Filed: Jul. 19, 2019

(86) PCT No.: PCT/CN2019/096890
§ 371 (c)(1),
(2) Date: Oct. 20, 2020

(87) PCT Pub. No.: WO2020/093731
PCT Pub. Date: May 14, 2020

(65) Prior Publication Data
US 2021/0238906 A1    Aug. 5, 2021

(30) Foreign Application Priority Data
Nov. 7, 2018   (CN) .......................... 201811320459.4

(51) Int. Cl.
*E05F 15/00*     (2015.01)
*E05F 15/622*    (2015.01)
(Continued)

(52) U.S. Cl.
CPC ............ *E05F 15/622* (2015.01); *E05F 15/70* (2015.01); *B60J 5/047* (2013.01); *E05Y 2201/21* (2013.01); *E05Y 2900/531* (2013.01)

(58) Field of Classification Search
CPC ....... E05F 15/622; E05F 15/70; E05F 15/619; E05Y 2201/21; E05Y 2201/216;
(Continued)

(56) References Cited

U.S. PATENT DOCUMENTS 6,389,753 B1 * 5/2002 Fenelon ................ E05F 11/423
                                                185/40 R
9,174,517 B2 * 11/2015 Scheuring ................ B60J 5/047
(Continued)

FOREIGN PATENT DOCUMENTS

CN         1308703 A      8/2001
CN       201679375 U     12/2010
(Continued)

OTHER PUBLICATIONS

International Search Report for Application No. PCT/CN2019/096890, dated Oct. 16, 2019, 2 pages.
(Continued)

*Primary Examiner* — Chi Q Nguyen
(74) *Attorney, Agent, or Firm* — Seyfarth Shaw LLP

(57) ABSTRACT

A nut leadscrew type automatic door opening and closing mechanism, an automobile automatic door, and an automobile. The nut leadscrew type automatic door opening and closing mechanism includes a driving device, a gearbox, a nut gear, and a leadscrew. The driving device is fixedly connected to a door, the gearbox is hinged to the door, and the nut gear is disposed in the gearbox. One end of the leadscrew is hinged to a vehicle body, and the other end extends in an axial direction. The nut gear is sleeved on the leadscrew, and the driving device is configured to drive the
(Continued)

nut gear to rotate, so that the nut gear is reciprocally linearly movable along the leadscrew to push the door to open or close relative to the vehicle body.

10 Claims, 4 Drawing Sheets

(51) Int. Cl.
    *E05F 15/70* (2015.01)
    *B60J 5/04* (2006.01)
(58) Field of Classification Search
    CPC ......... E05Y 2900/531; E05Y 2201/434; E05Y 2900/716; E05Y 2201/70; E05Y 2201/722; E05Y 2600/32; E05Y 2201/704; E05Y 2201/702; B60J 5/047; F16H 1/28
    USPC .................................. 49/280, 348, 349, 350
    See application file for complete search history.

(56) References Cited

U.S. PATENT DOCUMENTS

| 10,041,281 | B1* | 8/2018 | Miu ...................... E05C 17/203 |
| 10,655,378 | B2* | 5/2020 | Podkopayev ............. F16D 3/46 |
| 10,711,503 | B2* | 7/2020 | Linden .................. E05F 15/619 |
| 2004/0113456 | A1 | 6/2004 | Greuel |
| 2016/0312514 | A1* | 10/2016 | Leonard ................. E05F 1/1041 |
| 2017/0292310 | A1 | 10/2017 | Podkopayev |
| 2017/0292311 | A1* | 10/2017 | Podkopayev ......... E05C 17/203 |
| 2018/0080271 | A1 | 3/2018 | Oster et al. |
| 2018/0155968 | A1* | 6/2018 | Miu ...................... E05C 17/203 |
| 2018/0223583 | A1* | 8/2018 | Podkopayev ......... E05F 15/622 |
| 2019/0017311 | A1* | 1/2019 | McGettrick ........... E05F 15/622 |
| 2020/0232262 | A1* | 7/2020 | Marlia ................... B60R 25/34 |

FOREIGN PATENT DOCUMENTS

| CN | 103277472 A | 9/2013 |
| CN | 109252782 A | 1/2019 |
| EP | 3572607 | 11/2019 |
| JP | 2004523683 | 8/2004 |
| JP | 2006336297 A | 12/2006 |
| JP | 2011094423 | 5/2011 |

OTHER PUBLICATIONS

Examination Report for corresponding Application No. GB2106471.2 dated Apr. 1, 2022, 3 pages.

Japanese Office Action for corresponding Application No. 2021-525095 dated Mar. 22, 2022, 2 pages.

* cited by examiner

NUT LEADSCREW TYPE AUTOMATIC DOOR OPENING AND CLOSING MECHANISM, AUTOMOBILE AUTOMATIC DOOR, AND AUTOMOBILE

TECHNICAL FIELD

The present disclosure relates to the field of automobile technology, and in particular to a nut leadscrew type automatic door opening and closing mechanism, an automobile automatic door, and an automobile.

BACKGROUND

Currently, the automation and intelligence of automobiles have become the mainstream of automobile development. Unmanned driving, automatic parking and other humanized configurations have gradually entered into the automobile for daily use, and the automatic door is the main functional selling point of electric new energy automobile. The technology-rich function of automatic opening and closing of the door not only improves the grade of the automobile, but also greatly facilitates the owner of the automobile for their daily use. Therefore, for the traditional automobile, it is also necessary to upgrade and modify so as to meet the needs of the market. The traditional automobile automatic door opening and closing mechanisms mostly employs four link mechanisms, which have low efficiency, need a large occupied space, and have a high requirement for the installation of the door, thereby limiting the intelligent upgrade and modification of the door.

SUMMARY

Based on the above, it is necessary to provide a nut leadscrew type automatic door opening and closing mechanism, an automobile automatic door and an automobile for solving the problems that the conventional automobile automatic door opening and closing mechanism has low efficiency and needs a large space.

A nut leadscrew type automatic door opening and closing mechanism includes a driving device, a gearbox, a nut gear and a leadscrew. The driving device is fixedly connected to a door, the gearbox is hinged to the door, and the nut gear is disposed in the gearbox. One end of the leadscrew is hinged to a main body, and the other end of the leadscrew extends in an axial direction. The nut gear is sleeved on the leadscrew, and the driving device is configured to drive the nut gear to rotate, so that the nut gear is reciprocally linearly movable along the leadscrew to push the door to open or close relative to the main body.

The above-mentioned nut leadscrew type automatic door opening and closing mechanism can realize automatic opening and closing of an automobile door by the cooperation of the driving device, the gearbox, the nut gear and the leadscrew. Specifically, the door and the main body are connected by a door hinge, and the leadscrew and a side of the main body are connected through a leadscrew hinge. During opening or closing the door, the nut gear is driven by the driving device to rotate and be reciprocally linearly movable along the leadscrew, then an axial force is generated, and the axial force finally acts on the hinge between the leadscrew and the side of the main body via the leadscrew. A reaction force is generated from the side of the main body, and it acts on the door along the leadscrew. Since the reaction force does not pass through a rotation center of the door, there is an arm between the reaction force and the rotation center of the door, so that a rotational moment is generated to drive the door to open or close automatically. At the same time, since a hinge center of the leadscrew is inconsistent with the rotation center of the door, an opening angle of the door is different from a swing angle of the leadscrew. The above-mentioned nut leadscrew type automatic door opening and closing mechanism uses the gearbox to be hinged to the door, so that the gearbox can swing relative to the door to automatically compensate the angle difference and to coaxially cooperate with the leadscrew, thereby ensuring the normal operation of the nut leadscrew. The nut leadscrew type automatic door opening and closing mechanism of the present disclosure has the advantages of a simple overall structure, a reliable cooperation, a small occupied space, a small modification to an original automobile door structure, and a high versatility; and the nut leadscrew has a high transmission efficiency, the opening and closing of the door can be realized by using a smaller driving device, so that the nut leadscrew type automatic door opening and closing mechanism can well meet the development requirements of small volume and light weight.

In one embodiment, the driving device includes a driving motor and a driving gear, and the driving gear is connected to a rotating shaft of the driving motor, and the nut gear engages with the driving gear.

In one embodiment, the nut leadscrew type automatic door opening and closing mechanism further includes a bracket fixedly connected to the door, the driving motor is fixedly connected to the bracket, the gearbox is hinged to the bracket through a gearbox hinge extending vertically, the driving gear and the nut gear are both disposed in the gearbox, and the leadscrew penetrates the gearbox in an axial direction.

In one embodiment, the driving motor is vertically placed, the rotating shaft of the driving motor extends vertically, the driving gear and the nut gear are both bevel gears, and the driving gear and the nut gear are perpendicular to each other and engage with each other.

In one embodiment, the rotating shaft of the driving motor and the gearbox hinge extend along a same axis.

In one embodiment, the nut leadscrew type automatic door opening and closing mechanism further includes a brake disposed between the driving motor and the driving gear.

In one embodiment, the nut leadscrew type automatic door opening and closing mechanism further includes a clutch disposed between the driving motor and the brake.

In one embodiment, the clutch includes a base, an input shaft, an output shaft, and a magnetic column, the input shaft passes through the base and is embedded in a disc of the output shaft, two opposite side faces of the input shaft are respectively arranged as planes, the input shaft is connected to the driving motor, the output shaft is connected to the driving gear, and the disc of the output shaft is provided with a semicircular groove for inserting the magnetic column, both ends of the magnetic column are respectively in contact with the base and the output shaft, and an outer peripheral surface of the magnetic column is magnetically attracted to the plane of the input shaft.

An automobile automatic door includes the nut leadscrew type automatic door opening and closing mechanism as described above.

An automobile includes the automobile automatic door as described above.

Figure 1:
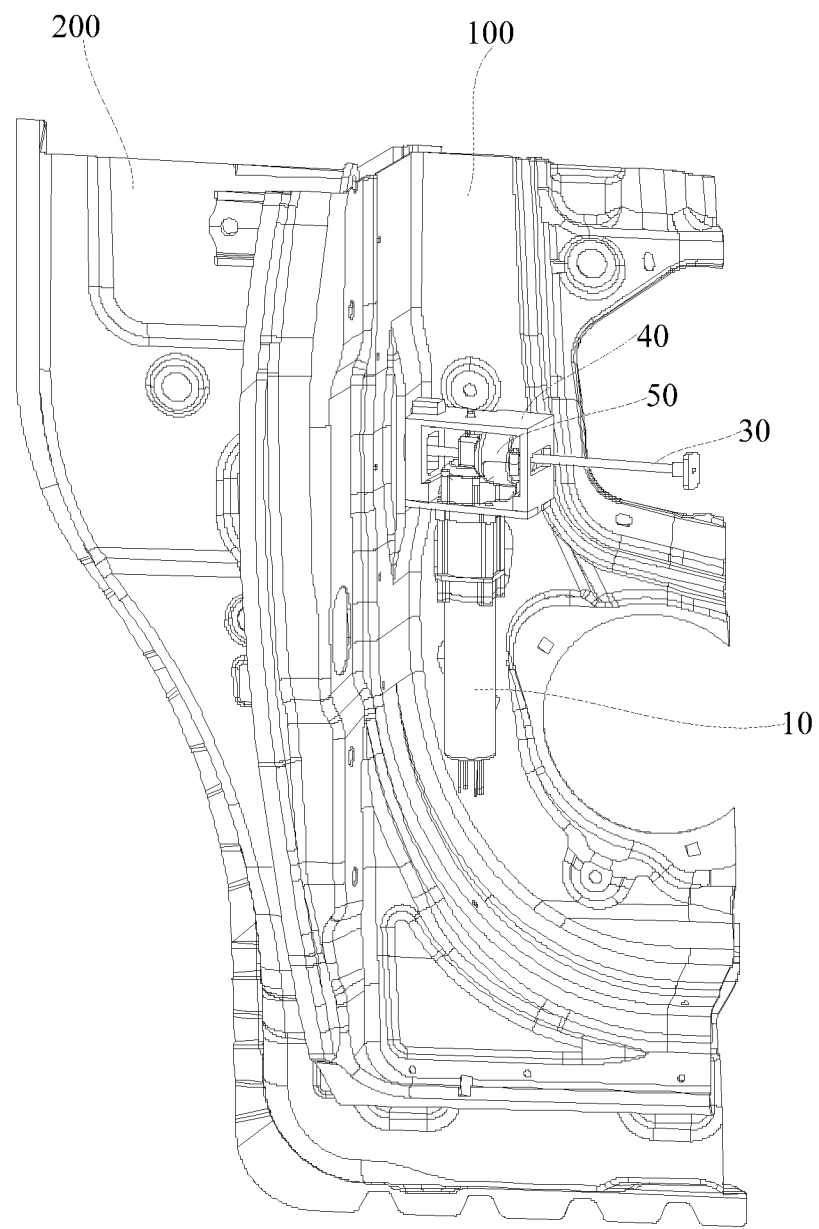
FIG. 1 is a schematic structural view of a nut leadscrew type automatic door opening and closing mechanism according to an embodiment of the present disclosure.

10 driving motor, 11 driving gear, 20 nut gear, 30 leadscrew, 31 leadscrew hinge, 40 bracket, 50 gearbox, 51 gearbox hinge, 60 brake, 70 clutch, 71 base, 72 input shaft, 73 output shaft, 74 magnetic column, 100 door, 110 door hinge, 200 main body.

DETAILED DESCRIPTION

In order to facilitate understanding of the present disclosure, the present disclosure will be described more fully hereinafter with reference to the accompanying drawings. The drawings show a preferred embodiment of the present disclosure. However, the present disclosure may be implemented in many different forms and is not limited to the embodiments described herein. Rather, these embodiments are provided to provide a thorough understanding of the present disclosure.

It should be noted that when an element is referred to as being "fixed to" (or "fixed connected to" an other element, it may be directly on the other element or fixed to the other element via an intermediate element. When an element is considered to be "connected" to an other element, it can be directly connected to the other element or connected to the other element via an intermediate element. In contrast, when an element is referred to as being "directly on" another element, there is no intermediate element. The terms "vertical," "horizontal," "left," "right," and the like, as used herein, are for illustrative purposes only.

Referring to FIG. 1 to FIG. 7, a nut leadscrew type automatic door opening and closing mechanism includes a driving device, a gearbox 50, a nut gear 20, and a leadscrew 30. The driving device is fixedly connected to a door 100, and the gearbox 50 is hinged to the door 100. The nut gear 20 is disposed in the gearbox 50. One end of the leadscrew 30 is hinged to a main body 200, the other end of the leadscrew extends in an axial direction. The nut gear 20 is sleeved on the leadscrew 30. The driving device is configured to drive the nut gear 20 to rotate, so that the nut gear 20 is reciprocally linearly movable along the leadscrew 30, thereby pushing the door 100 to open or close relative to the main body 200.

The nut leadscrew type automatic door opening and closing mechanism can be applied to the automatic opening and closing of an automobile door, and of course, it can also be applied to the automatic opening and closing of doors of other devices. The following mainly describes the application of the nut leadscrew type automatic door opening and closing mechanism on the automobile door. Specifically, the automobile door 100 is connected to a side of the automobile main body 200 through a door hinge 110, and then can be rotatable relative to the main body 200. The driving device can be directly fixed to the door 100 or fixed to the door 100 through a bracket 40. One end of the leadscrew 30 is hinged to the main body 200 through a leadscrew hinge 31, and an inner hole of the nut gear 20 is provided with a spiral line to cooperate with the leadscrew 30 to form a nut leadscrew pair. The spiral transmission between the nut gear 20 and the leadscrew 30 can be a sliding spiral, a rolling spiral or a static pressure spiral. Since the nut leadscrew generates an axial force during transmission, thrust bearings can be provided at both ends of the nut gear 20, so that the nut gear 20 can smoothly perform rotation movement under the action of the axial force. In addition, the nut leadscrew type automatic door opening and closing mechanism further includes a control unit electrically connected to the driving device, and the control unit is configured to control the running and the stopping of the driving device.

The above-mentioned nut leadscrew type automatic door opening and closing mechanism can realize automatic opening and closing of the automobile door 100 by the cooperation of the driving device, the gearbox 50, the nut gear 20 and the leadscrew 30. Specifically, the door 100 and the automobile body 200 are connected through the door hinge 110. During opening or closing the door 100, the nut gear 20 is driven by the driving device to rotate and be reciprocally linearly movable along the leadscrew 30, then an axial force is generated, and the axial force finally acts on the hinge between the leadscrew 30 and the side of the automobile body 200 via the leadscrew 30. A reaction force is generated from the side of the automobile body 200, and it acts on the door 100 along the leadscrew 30. Since the reaction force does not pass through a rotation center of the door 100, there is an arm between the reaction force and the rotation center of the door 100, so that a rotational moment is generated to drive the door 100 to open or close automatically. At the same time, since a hinge center of the leadscrew 30 is inconsistent with a rotation center of the door 100, an opening angle of the door 100 is different from a swing angle of the leadscrew 30. The above-mentioned nut leadscrew type automatic door opening and closing mechanism uses the gearbox 50 to be hinged to the door 100, so that the gearbox 50 can swing relative to the door to automatically compensate the angle difference and to coaxially cooperate with the leadscrew 30, thereby ensuring the normal operation of the nut leadscrew. The nut leadscrew type automatic door opening and closing mechanism of the present disclosure has the advantages of simple overall structure, reliable cooperation, small movement space, small modification to an original automobile door 100 structure, and high versatility; and the nut leadscrew has a high transmission efficiency, the opening and closing of the door 100 can be realized by using a smaller driving device, so that the nut leadscrew type automatic door opening and closing mechanism can well meet the development requirements of small volume and light weight.

Figure 2:
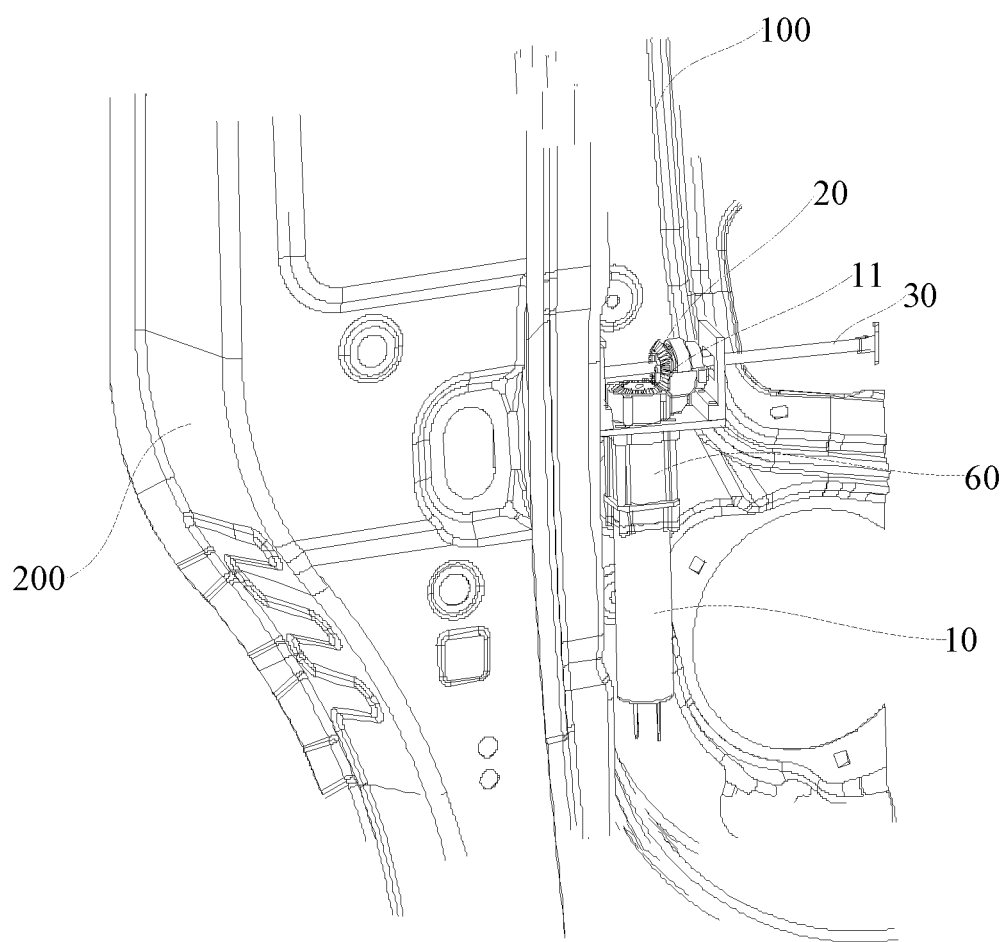
FIG. 2 is a partial schematic structural view of the nut leadscrew type automatic door opening and closing mechanism in FIG. 1.
Figure 3:
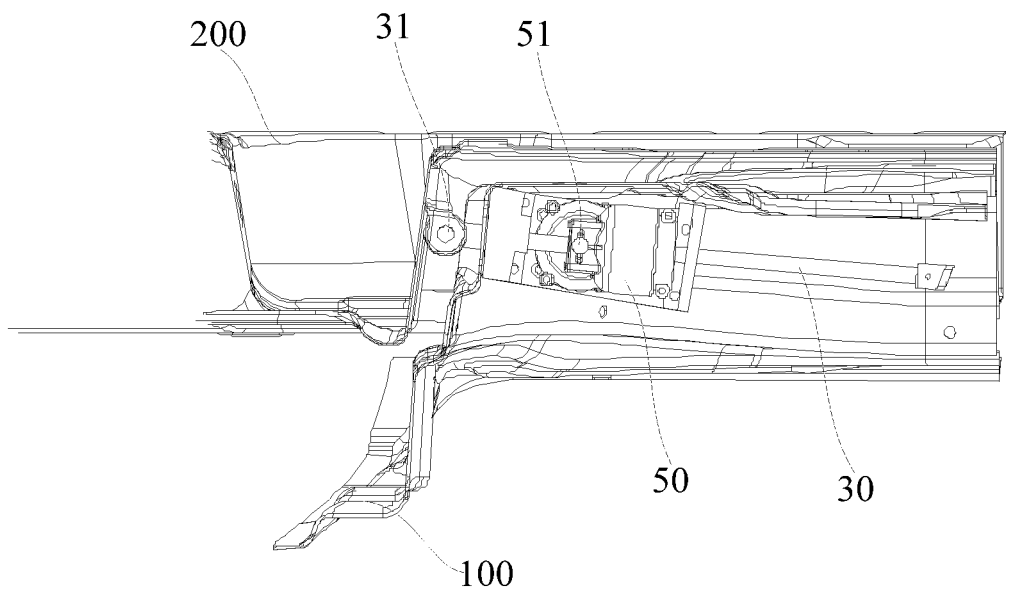
FIG. 3 is a schematic top view of the nut leadscrew type automatic door opening and closing mechanism in FIG. 1.

In one embodiment, referring to FIG. 2, the driving device includes a driving motor 10 and a driving gear 11, and the driving gear 11 is connected to a rotating shaft of the driving motor 10, and the nut gear 20 engages with the driving gear 11. The driving gear 11 is driven to rotate by the rotating shaft of the driving motor 10, thereby driving the nut gear 20 to rotate. The driving motor 10 can be placed in various forms, such as horizontally or vertically or at an angle, and it can be adjusted according to the internal space of the door 100. Accordingly, the structures of the driving gear 11 and the nut gear 20 can be adjusted according to the placement form of the driving motor 10.

Further, the nut leadscrew type automatic door opening and closing mechanism further includes a bracket 40. The bracket 40 is fixedly connected to the door 100, and the driving motor 10 is fixedly connected to the bracket 40. The gearbox 50 is hinged to the bracket 40 through a gearbox hinge 51 extending vertically. The driving gear 11 and the nut gear 20 are both disposed in the gearbox 50, and the leadscrew 30 penetrates the gearbox 50 in an axial direction.

In this embodiment, the bracket 40 is provided to facilitate the installation of the driving motor 10 and the gearbox 50, so that the structural modifications to the door 100 itself can be reduced, and the versatility can be further improved. Specifically, the bracket 40 is provided in a frame shape, one side of the bracket 40 is fixedly connected to the door 100, and the driving motor 10 is indirectly fixed to the door 100 through the bracket 40. The gearbox 50 is disposed inside the bracket 40 and hinged to the bracket 40. The projection of the gearbox hinge 51 is located on a central axis of the leadscrew 30, and the nut gear 20 is fixedly in the gearbox 50 through a shaft hole. The leadscrew 30 penetrates the gearbox 50 in an axial direction and is in transmission engagement with the nut gear 20. Since the hinge center of the leadscrew 30 is inconsistent with the rotation center of the door 100, the opening angle of the door 100 is different from the swing angle of the leadscrew 30. The gearbox 50 is hinged to the bracket 40, so that the gearbox 50 can swing freely around the gearbox hinge 51 to automatically compensate for the angle difference and to coaxially cooperate with the leadscrew 30, thereby ensuring normal operation of the nut leadscrew. In addition, due to processing precision and the assembly error, the connecting hinges are not parallel to each other, in order to ensure the smooth movement of the nut leadscrew mechanism, and make the door 100 be opened and closed smoothly, the hinge cooperation between the leadscrew 30 and the side of the main body 200, and the hinge cooperation between the gearbox 50 and the bracket 40 can adopt spherical pairs to hinge.

Further, the driving motor 10 is vertically placed, the rotating shaft of the driving motor 10 extends vertically, the driving gear 11 and the nut gear 20 are both bevel gears, and the driving gear 11 and the nut gear 20 are perpendicular to each other and engage with each other. Specifically, the driving motor 10 is vertically placed and fixed to a bottom of the bracket 40, and the rotating shaft of the driving motor 10 enters into the gearbox 50. The driving gear 11 is horizontally placed and connected to the rotating shaft of the driving motor 10, and the nut gear 20 is vertically placed and engage with the driving gear 11. In the above structure, two bevel gears intersect perpendicularly and transmit power to drive the nut gear 20 to rotate, realizing vertical placement of the driving motor 10 and its fixing with the bracket 40. The moving parts are reduced, the installation structure is simplified, and the reliability of the entire mechanism is improved. At the same time, the rotating shaft of the driving motor 10 is parallel to the gearbox hinge 51 of the gearbox 50 by placing the driving motor 10 vertically, thereby reducing the swinging movement space of the gearbox 50 and the driving motor 10.

Further, the rotating shaft of the driving motor 10 and the gearbox hinge 51 extend along the same axis. The rotation shaft of the driving motor 10 is disposed coaxially with the gearbox hinge 51 of the gearbox 50, so that the motor can be kept stationary, and only the gearbox 50 can swing.

In one embodiment, the nut leadscrew type automatic door opening and closing mechanism further includes a brake 60 disposed between the driving motor 10 and the driving gear 11. By providing the brake 60, when the driving motor 10 stop, the brake 60 is locked, and the frictional torque of the brake 60 can ensure that the door 100 is hovered at the current position, thereby effectively preventing the door 100 from being unable to maintain at the current position due to its own weight after being open, which affects use. When the driving motor 10 drives the driving gear 11 to rotate, the brake 60 is released, so that the door 100 can rotate normally. In order to achieve a better running effect and ergonomics, the brake 60 is preferably an electromagnetic brake. Of course, other forms of brake 60 or friction devices can also be used, such as a spring brake.

Due to the friction inside the driving motor 10, when manually opening or closing the door, it needs to overcome the friction to allow the driving gear 11 to rotate, that is, it is necessary to overcome resistance to open or close the door 100, which affects user experience. In order to achieve better ergonomics, in one embodiment, the nut leadscrew type automatic door opening and closing mechanism further includes a clutch 70 disposed between the driving motor 10 and the brake 60. When the door is electrically opened or closed, the clutch 70 is engaged to transmit the driving force. When the door is manually opened or closed, the clutch 70 is disengaged, and the door 100 can be easily opened or closed.

Figure 6:
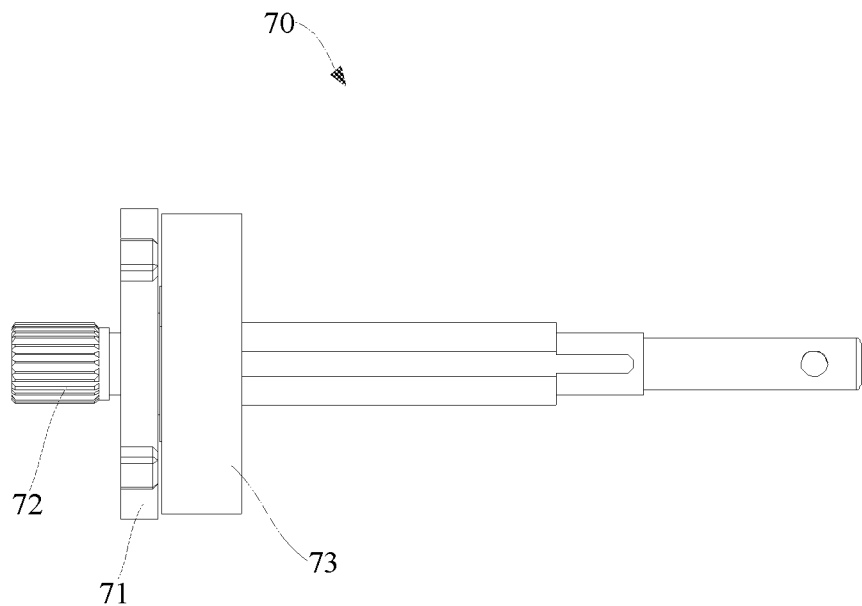
FIG. 6 is a schematic structural view of a clutch of a nut leadscrew type automatic door opening and closing mechanism according to an embodiment.
Figure 7:
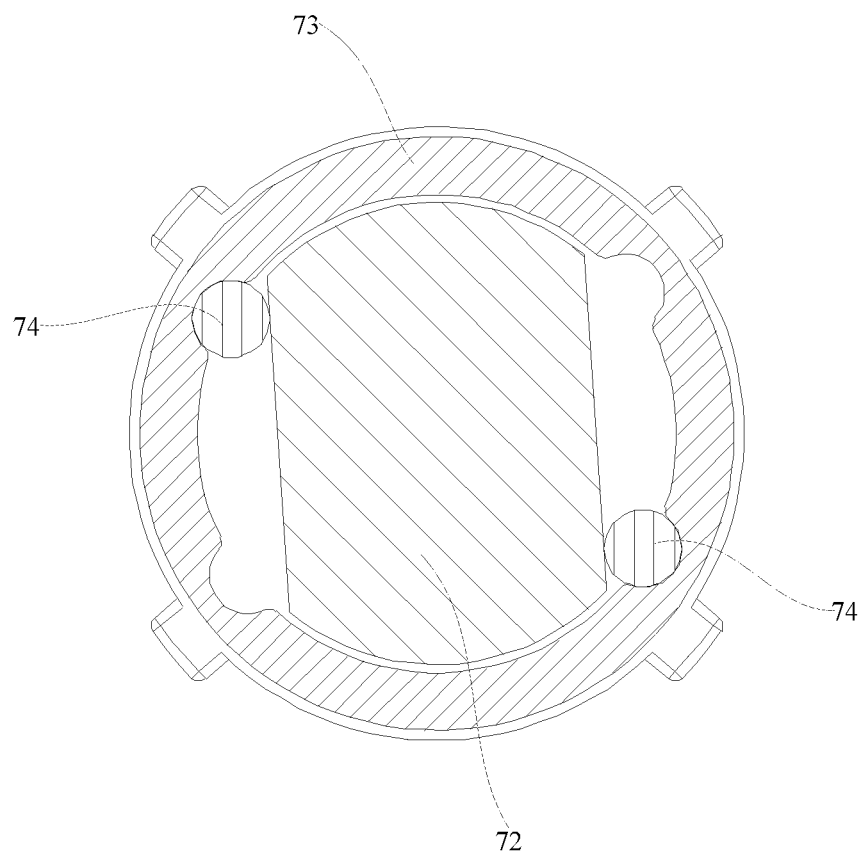
FIG. 7 is a schematic sectional structural view of the clutch in FIG. 6.

Further, referring to FIG. 6 and FIG. 7, the clutch 70 includes a base 71, an input shaft 72, an output shaft 73, and a magnetic column 74. The input shaft 72 passes through the base 71 and is embedded in a disc of the output shaft 73. Two opposite side faces of the input shaft 72 are respectively arranged in a plane, the input shaft 72 is connected to the driving motor 10, and the output shaft 73 is connected to the driving gear 11. The disc of the output shaft 73 is provided with a semicircular groove for inserting the magnetic column 74, both ends of the magnetic column 74 are respectively in contact with the base 71 and the output shaft 73, and an outer peripheral surface of the magnetic column 74 is magnetically attracted to the plane of the input shaft 72.

Specifically, the clutch 70 is a mechanical one-way transmission clutch, i.e., power can only be transmitted from the input shaft 72 to the output shaft 73, and cannot be transmitted in a reverse direction. The input shaft 72 is connected to the driving motor 10, and the output shaft 73 is connected to the driving gear 11. When manually opening or closing the door, the door can be easily opened or closed without overcoming the friction of the motor. The clutch 70 includes the input shaft 72, the output shaft 73, the base 71, and the magnetic columns 74. The base 71 is made of a permeability magnetic material, and a through hole is provided in the middle. The input shaft 72 is made of a permeability magnetic material, and it passes through the base 71 and is embedded in the disk of the output shaft 73 and coaxial with the output shaft 73. The output shaft 73 is made of a nonmagnetic material, a pair of semicircular grooves are provided in the inner side of the disk of the output shaft 73, and the magnetic columns 74 can be placed in the semicircular grooves. The upper and lower end faces of the magnetic columns 74 are respectively in contact with the base 71 and the disk of the output shaft 73, and the magnetic columns 74 rely on their magnetic force to attract the base 71 to ensure that they do not fall during the movement.

When the input shaft 72 rotates clockwise, the planes press the magnetic columns 74. Since the magnetic columns 74 are placed in the semicircular grooves of the output shaft 73 and cannot be disengaged, the input shaft 72 drives the output shaft 73 to rotate through the magnetic columns 74, realizing power transmission. When the input shaft 72 stops rotating and the output shaft 73 rotates counterclockwise, the magnetic columns 74 are moved together by the semicircular grooves of the output shaft 73. At the same time, due to the action of the magnetic force, the magnetic columns 74 always engage with the planes of the input shaft 72 and moves along the planes, so the input shaft 72 remains stationary, achieving one-way transmission. When the output shaft 73 rotates over a predetermined angle, the magnetic columns 74 are completely disengaged with the semicircular grooves of the output shaft 73. When the input shaft 72 rotates next time, the magnetic columns 74 are pushed into the semicircular grooves of the output shaft 73 again.

The present disclosure also provides an automobile automatic door, which comprises the nut leadscrew type automatic door opening and closing mechanism as described above, and the specific structure of the nut leadscrew type automatic door opening and closing mechanism can refer to the above embodiment. Since the automobile automatic door adopts all the technical solutions of the above embodiments, and thus at least includes all the beneficial effects brought by the above embodiments, and will not be described in detail herein.

The opening and closing actions of the automobile automatic door according to an embodiment of the present disclosure will be described in detail below with reference to FIGS. 4 and 5, taking the right-handed sliding nut leadscrew and the primary driver door as example. For left-handed nut leadscrew, it can be driven by the motor in a reverse direction.

Figure 4:
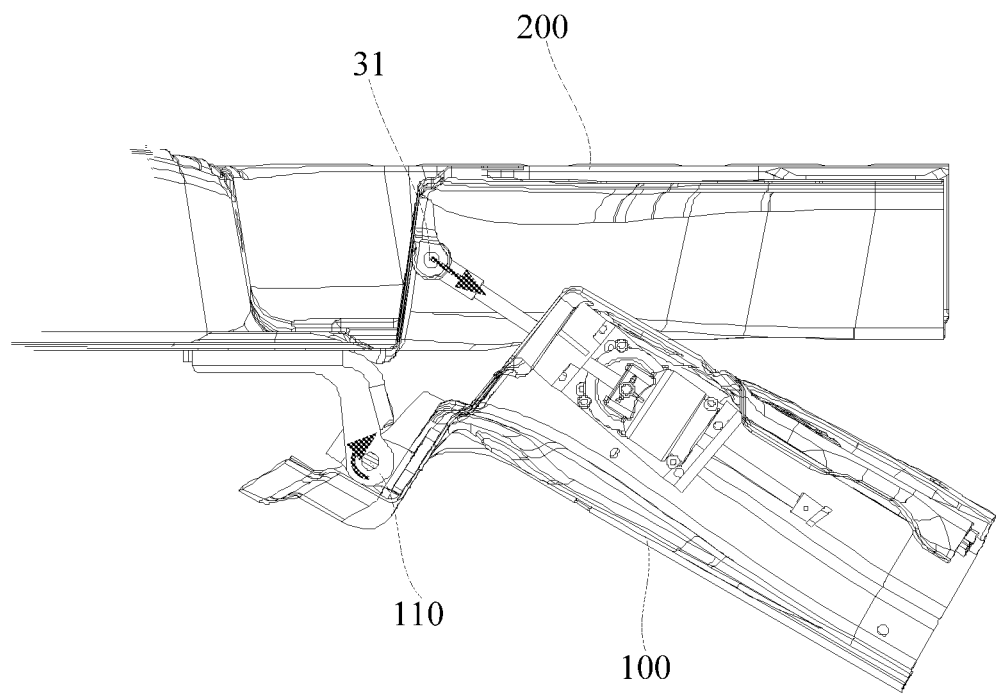
FIG. 4 is a schematic view when the nut leadscrew type automatic door opening and closing mechanism is driving a door to open.

As shown in FIG. 4, when the driving motor 10 receives an ECU instruction "open the door", the rotating shaft of driving motor 10 rotates counterclockwise, and the engaged nut gear 20 rotates clockwise. The nut leadscrew pair generates an axial force in a direction toward the leadscrew hinge 31. This axial force finally acts on the leadscrew hinge 31 hinged between the leadscrew 30 and the side of the automobile body 200 via the leadscrew 30. The side of the automobile body 200 also generates a reaction thrust acting on the door 100 along the leadscrew 30. Therefore, the reaction force does not pass through the rotation center of the door 100, and a clockwise rotational moment is generated to drive the door 100 to rotate to open. During opening the door 100, the nut also moves linearly along the leadscrew 30 toward the rear of the automobile, and the gearbox 50 swings around the hinge 51 to ensure the cooperation of the nut gear 20 and the leadscrew 30.

Figure 5:
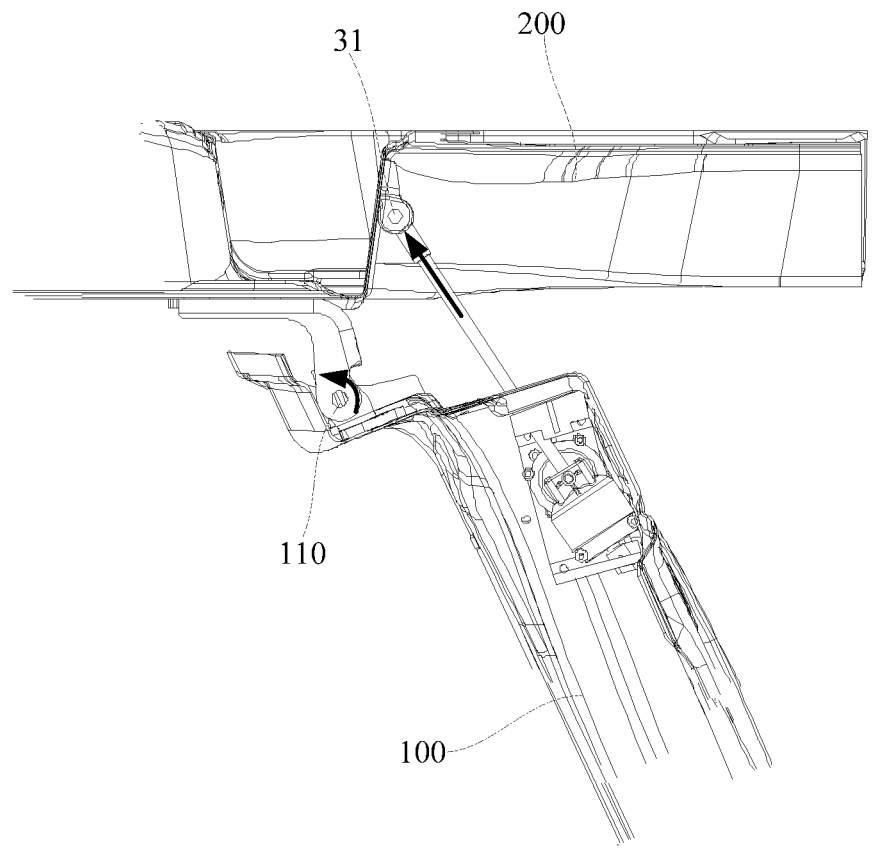
FIG. 5 is a schematic view when the nut leadscrew type automatic door opening and closing mechanism is driving a door to close.

As shown in FIG. 5, when the driving motor 10 receives an ECU instruction "close the door", the rotating shaft of driving motor 10 rotates clockwise, and the engaged nut gear 20 rotates counterclockwise. The nut leadscrew pair generates an axial force in a direction away from the leadscrew hinge 31, and the side of the automobile body 200 generates a reaction tension, and a counterclockwise rotational moment is generated to drive the door 100 to rotate to close.

The present disclosure also provides an automobile including the automobile automatic door as described above, the automobile automatic door includes the nut leadscrew type automatic door opening and closing mechanism as described above, and the specific structure of the nut leadscrew type automatic door opening and closing mechanism can refer to the above embodiment. Since the automobile automatic door adopts all the technical solutions of the above embodiments, and thus at least includes all the beneficial effects brought by the above embodiments, and will not be described in detail herein.

All of the technical features in the above embodiments may be employed in arbitrary combinations. For purpose of simplifying the description, not all arbitrary combinations of the technical features in the above embodiments are described. However, as long as such combinations of the technical features are not contradictory, they should be considered as within the scope of the disclosure in this specification.

The above embodiments merely represent several embodiments of the present disclosure, and the description thereof is more specific and detailed, but they should not be construed as limiting the scope of the disclosure. It should be noted that for those skilled in the art, several variations and improvements may be made without departing from the concept of the present disclosure. And these are all within the protection scope of the present disclosure. Therefore, the scope of protection of the present disclosure shall be subject to the appended claims.

What is claimed is:

1. A nut leadscrew type automatic door opening and closing mechanism for moving a door of a motor vehicle relative to a vehicle body, comprising:
   a driving device configured to be fixedly connected to the door;
   a gearbox configured to be hinged to the door;
   a nut gear disposed in the gearbox; and
   a leadscrew, wherein one end of the leadscrew is configured to be hinged to the vehicle body, and the other end of the leadscrew extends in an axial direction; and
   wherein the nut gear is sleeved on the leadscrew, and the driving device is configured to drive the nut gear to rotate, so that the nut gear is reciprocally linearly movable along the leadscrew to push the door to open or close relative to the vehicle body.

2. The nut leadscrew type automatic door opening and closing mechanism according to claim 1, wherein the driving device includes a driving motor and a driving gear, the driving gear is connected to a rotating shaft of the driving motor, and the nut gear engages with the driving gear.

3. The nut leadscrew type automatic door opening and closing mechanism according to claim 2, further comprising a bracket fixedly connected to the door, wherein the driving motor is fixedly connected to the bracket, the gearbox is hinged to the bracket via a gearbox hinge extending vertically, the driving gear and the nut gear are both disposed in the gearbox, and the leadscrew penetrates the gearbox in an axial direction.

4. The nut leadscrew type automatic door opening and closing mechanism according to claim 3, wherein the driving motor is vertically placed, the rotating shaft of the driving motor extends vertically, the driving gear and the nut gear are both bevel gears, and the driving gear and the nut gear are perpendicular to each other and engage with each other.

5. The nut leadscrew type automatic door opening and closing mechanism according to claim 4, wherein the rotating shaft of the driving motor and the gearbox hinge extend along a same axis.

6. The nut leadscrew type automatic door opening and closing mechanism according to claim 2, further comprising a brake disposed between the driving motor and the driving gear.

7. The nut leadscrew type automatic door opening and closing mechanism according to claim 6, further comprising a clutch disposed between the driving motor and the brake.

8. The nut leadscrew type automatic door opening and closing mechanism according to claim 7, wherein the clutch comprises a base, an input shaft, an output shaft and a magnetic column, the input shaft passes through the base and is embedded in a disc of the output shaft, two opposite side faces of the input shaft are arranged as planes, the input shaft is connected to the driving motor, the output shaft is connected to the driving gear, and the disc of the output shaft is provided with a semicircular groove for inserting the magnetic column; both ends of the magnetic column respectively contact with the base and the output shaft, and an outer peripheral surface of the magnetic column is magnetically attracted to the plane of the input shaft.

9. An automobile automatic door, comprising the nut leadscrew type automatic door opening and closing mechanism according to claim 1.

10. An automobile, comprising the automobile automatic door according to claim 9.

\* \* \* \* \*